United States Patent
Bridges

(10) Patent No.: US 6,705,946 B2
(45) Date of Patent: Mar. 16, 2004

(54) OIL-LESS SHAFT COUPLING UTILIZING CARBON-CARBON COMPOSITE AND METHOD OF FABRICATION THEREOF

(75) Inventor: Eric B. Bridges, Tempe, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/884,405

(22) Filed: Jun. 18, 2001

(65) Prior Publication Data

US 2002/0193163 A1 Dec. 19, 2002

(51) Int. Cl.[7] .................................................. F16D 1/02
(52) U.S. Cl. ......................... 464/8; 403/359.1; 464/903
(58) Field of Search .................... 464/8, 9, 75, 162, 464/903; 403/359.1, 359.6, 365, 371, 383; 384/42

(56) References Cited

U.S. PATENT DOCUMENTS

| | | | |
|---|---|---|---|
| 1,775,556 A | * | 9/1930 | Hewel |
| 1,980,933 A | | 11/1934 | Simons |
| 2,539,630 A | * | 1/1951 | Krueger et al. |
| 2,830,445 A | | 4/1958 | Kressin |
| 3,556,273 A | * | 1/1971 | Maucher |
| 3,620,043 A | | 11/1971 | Gantschnigg |
| 3,645,589 A | * | 2/1972 | Bird |
| 4,098,096 A | | 7/1978 | Chard et al. |
| 4,330,133 A | * | 5/1982 | Palfreyman et al. ........ 277/412 |
| 4,350,896 A | * | 9/1982 | Benoit |
| 4,357,137 A | | 11/1982 | Brown |
| 4,464,141 A | | 8/1984 | Brown |
| 4,486,183 A | | 12/1984 | Posiviata et al. |
| 4,942,856 A | | 7/1990 | Jaki et al. |
| 5,383,811 A | | 1/1995 | Campbell et al. |
| 5,459,397 A | * | 10/1995 | Spillman, Jr. |
| 5,660,591 A | * | 8/1997 | Reynolds |
| 5,716,279 A | | 2/1998 | Ham et al. |
| 5,860,890 A | | 1/1999 | Antonov |
| 6,006,885 A | | 12/1999 | Borgeaud et al. |
| 6,042,500 A | | 3/2000 | Antonov |
| 6,044,819 A | * | 4/2000 | Rivers et al. |
| 6,431,654 B1 | * | 8/2002 | LeBegue |
| 6,514,003 B2 | * | 2/2003 | Horikawa ............ 403/359.1 X |
| 6,581,267 B1 | * | 6/2003 | Olbrich |
| 2002/0043438 A1 | * | 4/2002 | Nakanishi |

OTHER PUBLICATIONS

Merriam–Webster's Collegiate Dictionary, 10th ed., Merriam–Webster, Inc., Springfield MA, 1998, pp. 236 & 391.*
Takebayashi, H., *Bearings for Extreme Special Environments–Part 2– Bearings for Vacuum and Clean Environments–*, KOYO Engineering Journal English Edition No. 157E (2000).

* cited by examiner

*Primary Examiner*—Greg Binda
(74) *Attorney, Agent, or Firm*—Robert Desmond, Esq.

(57) ABSTRACT

A shaft coupling is made from carbon-carbon composite to achieve significantly higher temperature capability, combined with lubricity and high strength, allowing its use in hot, non-lubricated sections of gas turbine engines, where previously, these couplings could not be used. The coupler may be cylindrical for joining the facing ends of co-axial shafts is made from carbon-carbon composite with a female spline in a coupling bore and a male spline on the coupling outer surface. Variations of the torque carrying geometry include involute splines, circular splines, square drive, hex drives, serrations, or double-D drives. By fabricating the coupler from carbon-carbon (or carbon-graphite) composite, metallic shaft mating splines are provided with a coupler that has exceptionally high temperature capabilities (>2500 F.), high strength, and can be impregnated with graphite or other dry lubricants to reduce frictional heat generation and reduce spline wear. The useful temperature limit of the coupler may preferably exceed that of the mating shaft ends.

13 Claims, 1 Drawing Sheet

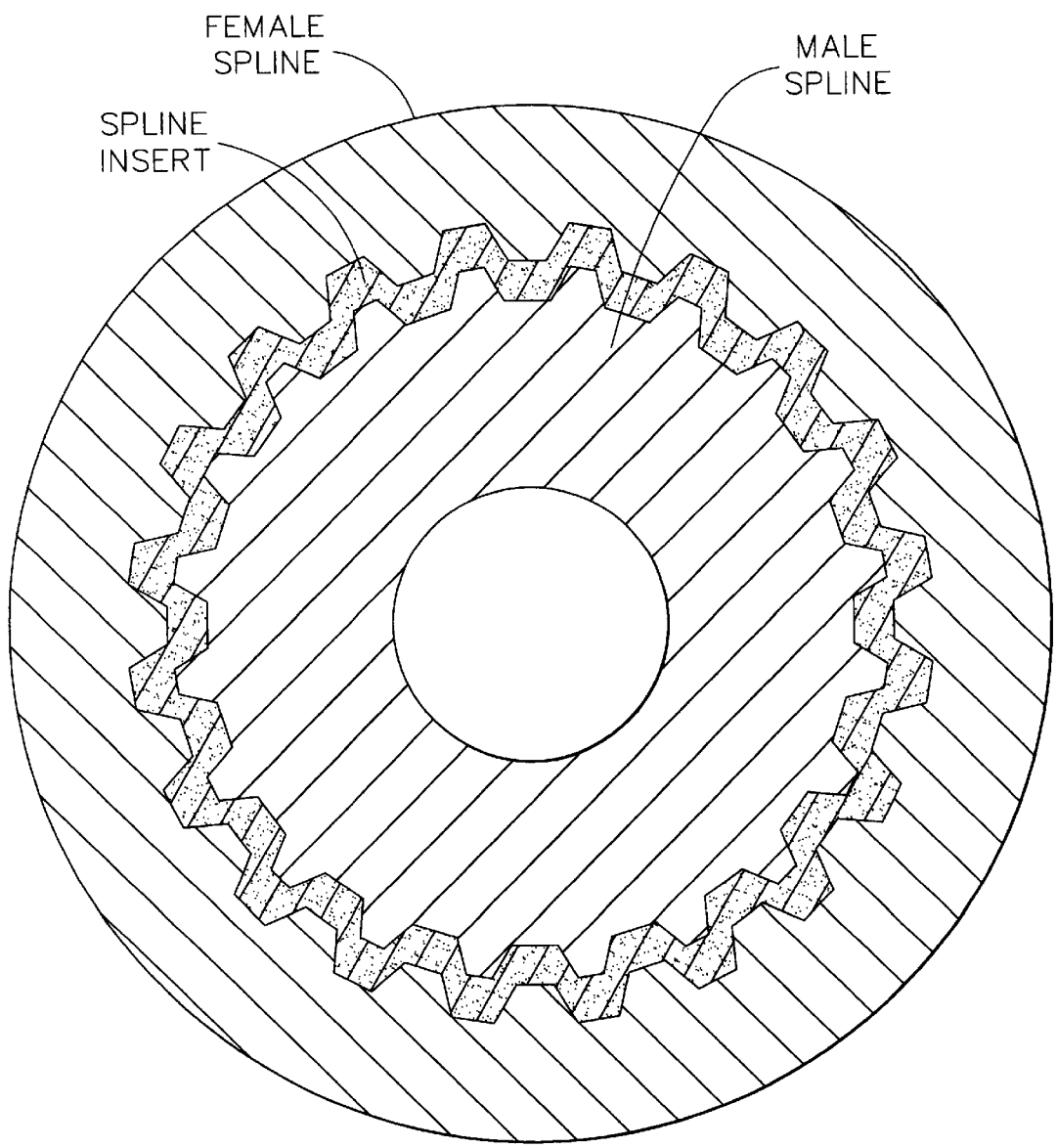

OIL-LESS SHAFT COUPLING UTILIZING CARBON-CARBON COMPOSITE AND METHOD OF FABRICATION THEREOF

BACKGROUND OF THE INVENTION

Advanced technology engines are moving towards the elimination of oil lubricated bearings, seals, gears and sumps. Oil lubricated engines have disadvantages in regard to shaft speed and temperature, as well as reliability and maintainability. There has been progress in the use of magnetic or foil air bearings for shaft support which eliminates the need for conventional bearings, sumps, seals, and the like. There is still however, a need to couple concentric sections of engine shafting to drive externally mounted accessories, or to provide modularity to the engine. This capability is normally met with oil or grease lubricated spline couplings. These couplings, however, require lubrication to prevent excessive wear of the metallic spline parts, and are temperature limited. A coupling is needed that can provide for misalignment between the shafts, transmit the maximum torque required of the shaft, operate at elevated temperatures (>400 F.) and allow the shafts to be separated on disassembly, while requiring no lubrication during operation.

Oil-less engine technology increases power density, improves specific fuel consumption (SFC), and reduces cost of ownership for gas turbine engines. The elimination of lubrication, seals, oil collers, pumps, scavenge systems and the like, utilizing foil air and/or magnetic bearings can produce significant cost, weight and sfc improvement. Oil-less bearings can be designed for higher temperature, higher Dn environments than were achievable with oil lubrication, where Dn=bearing inner diameter (mm)×rotational speed (rpm). Shaft couplings transmit torque between shaft sections, allow easy removal of accessories, accommodate minor shaft misalignment, and provide for a modular engine design. In addition to running without oil or grease, a new generation of shaft couplings with increased temperature capability is needed, for example, to allow for "hot end drives", where shaft power is extracted from the aft, hot end of the engine.

U.S. Pat. No. 3,620,043 for Spline-Type Pivots, Universal Joints and Flexible Couplers, discloses a typical spline joint. The device consists of a cylindrical insert made from self-lubricating polymeric material such as Amoco Torlon or Dupont Vespel. The part is made with an involute male spline on its OD, and a circular spline on the ID. The insert is installed with an interference fit into the mating female metallic spline. The male metallic spline engages the female circular spline in the insert during installation of the accessory, or shaft section. This type of insert provides the following benefits over a conventional oil or grease lubricated metallic spline pair: 1) It can be used as a replacement for worn involute spline couplings without modification or replacement of the accessory drive shaft; 2) it can be used dry, in applications where oil or grease spline lubrication is not used; and 3) the insert is sacrificial and is easily replaced when worn out, without any rework needed on the metallic components.

A significant limitation of this spline coupling, however, is the temperature capabilities of the adapter material. Torlon and Vespel are capable of maximum usage temperatures in the range of 450° F. This must include ambient temperature, and frictional heating of the spline adapter during operation.

U.S. Pat. Nos. 5,860,890; 6,042,500 and 6,006,885 each discloses the use of carbon-carbon composite material to transmit torque. Each of these patents disclose such use in regard to an automotive automatic transmission friction clutch disk. None of these examples of prior art relating to carbon-carbon composite material pertains to or suggests the use of such material as a high temperature, high strength, wear-resistant spline-type coupling insert, to provide an oil-less, self-lubricating tubular insert spline device for gas turbine engines.

SUMMARY OF THE INVENTION

A cylindrical coupler or coupling for joining the facing ends of coaxial shafts is made from carbon-carbon composite with a female spline in its bore and a male spline on the outer surface. Variations of the torque carrying geometry include involute splines, circular splines, square drive, hex drives, serrations, or double-D drives. By fabricating this coupler from carbon-carbon (or carbon-graphite) composite, metallic shaft mating splines are provided with a coupler that has exceptionally high temperature capabilities (>2500 F.), high strength, and can be impregnated with graphite or other dry lubricants to reduce frictional heat generation and reduce spline wear. The coupler should provide long life, and is easily replaced.

A preferred embodiment of a method for fabricating the inventive coupler comprises the principal steps of forming a shaped tubular blank of carbon-carbon composite material and machining the blank to provide mating surfaces to receive the facing end of co-axial shafts. An additional step may then include impregnating the machined blank with dry lubricant. The dry lubricant may include graphite, molybdenum disulphide and combinations thereof.

These and other features, aspects and advantages of the present invention will become better understood with reference to the following description and claims.

BRIEF DESCRIPTION OF THE DRAWINGS

The accompanying FIGURE is a cross-sectional view of connected shafting using an involute spline with a carbon-carbon composite inset according to the present invention.

DETAILED DESCRIPTION OF THE INVENTION

The present invention comprises the use of carbon-carbon composite (or carbon-graphite composite) to satisfy the requirements for oil-less shaft couplings to provide for high temperature oil-less power transmission between shafting. Carbon-carbon composites are currently in widespread use in aircraft disk brakes (for brake disks as well as pads), where the benefits of low density, high temperature mechanical properties, self-lubricating capability, low wear, and chemical inertness are exploited. The material can be custom tailored to change its properties, and due to its inherent porosity of approximately 13%, it can be impregnated with graphite or other dry-lubricants to further reduce friction and wear. As used herein, the terms "carbon-carbon composite" and "carbon-graphite composite" are equivalent and interchangeable.

Carbon-carbon composite materials generally consist of highly ordered polyacrylonitride-based or pitch-based carbon fibers embedded in a carbonaceous matrix made by chemical vapor infiltration (CVI), and/or impregnation of organic binders, followed by a graphitization/densification process. Tensile strengths in the range of 40–65 ksi are obtainable. Young's modulus is in the range of $13 \times 10^6$ psi. Density is approximately 0.06 lb/cubic inch, about 20% that of steel, giving carbon-carbon a specific strength greater than steel at high temperature.

The most important class of properties of carbon-carbon composites is their thermal properties. Carbon-carbon composites have very low thermal expansion coefficients, making them dimensionally stable at a wide range of temperatures, and they have high thermal conductivity. Carbon-carbon composites retain mechanical properties even at temperatures (in non-oxidizing atmospheres) above 2000° C. They are also highly resistant to thermal shock, or fracture due to rapid and extreme changes in temperature. The material properties of a carbon-carbon composite vary depending on the fiber fraction, fiber type selected, textile weave type and similar factors, and the individual properties of the fibers and matrix material. Fiber properties depend on precursor material, production process, degree of graphitization and orientation.

The tensioning step in fiber formation is critical in making a fiber (and therefore a composite) with useful strength. Matrix precursor material and manufacturing method have a significant impact on composite strength. Sufficient and uniform densification is necessary for a strong composite. Generally, the elastic modulus is very high, from 15–20 GPa for composites made with a 3D fiber felt to 150–200 GPa for those made with unidirectional fiber sheet. Other properties include low-weight, high abrasion resistance, high electrical conductivity, low hygroscopicity, non-brittle failure, and resistance to biological rejection and chemical corrosion. Carbon-carbon composites are very workable, and can be formed into complex shapes.

The shaft ends comprise male and female metallic (or metal-matrix composite, or ceramic matrix composite) shaft ends, with the torque carrying geometry machined onto the ID and OD of these shaft members, respectively. The torque carrying geometry can include involute splines, circular splines, hex drives, polygon drives, square drives, serrations, double-D drives, and the like. The carbon-carbon drive insert is inserted into the female shaft end, followed by insertion of the male shaft end into the carbon-carbon adapter ID. The carbon-carbon material is manufactured in an appropriate cylindrical form, reinforced with laminations of carbon fiber cloth, chopped fiber, or laminated mats oriented as needed to provide the required mechanical properties.

After processing of the carbon-carbon blank, the part is machined to final dimensions, incorporating the male and female spline, or drive geometry onto the ID and OD of the insert, to mate with the corresponding shaft members. Suitable processing/impregnation is done to impart self-lubricating characteristics. As an alternate, the part may be made in a near-net shape preform, with custom fiber orientation and part geometry molded/pressed into the part, minimizing or eliminating the need for post-machining, and maximizing strength due to improved fiber orientation. The resulting cylindrical part serves as a self-lubricating wear surface sandwiched between the mating shaft parts. The insert has a maximum temperature capability higher than the metallic parts in which it is mounted (i.e., over 2500° F. in non-oxidizing environments), allows for minimum wear on the shaft parts, and can be easily replaced when worn.

The accompanying drawing illustrates an example of the basic concept of the present invention. More specifically, the drawing shows an inventive oil-less shaft coupling using involute spline geometry wherein a female metal spline and a male metal spline are joined coaxially. A carbon-carbon composite spline insert is positioned between the metal splines.

It will now be apparent to those having skill in the relevant arts that the present invention provides a simple but nevertheless elegant and unobvious solution to the need for oil-less shaft couplings that meet extremely high temperature, high speed and high torque requirements. The invention herein may be configured as virtually any conventionally shaped shaft coupling. Therefore, the invention herein resides in the novel combination of material and function and is not necessarily limited to any specific coupling geometry.

Thus, the scope of the invention hereof is to be limited only by the appended claims and their equivalents.

I claim:

1. An article of manufacture joining the facing ends of a pair of coaxial shafts; the article comprising:
   a first shaft having a first shaft end;
   a second shaft having a second shaft end;
   a substantially cylindrical oil-less shaft coupling having an interior for receiving said first shaft end and an exterior for receiving said second shaft end, said coupling being made of a self-lubricating, dry lubricant impregnated carbon-carbon composite, and not a polymer matrix composite, said carbon-carbon composite having a maximum usage temperature which exceeds 2500° F., wherein said coupling provides for oil-less power transmission between said first shaft and said second shaft.

2. The article of manufacture recited in claim 1, wherein said coupling comprises splines for engaging at least one of said first shaft end and said second shaft end.

3. The article of manufacture recited in claim 1, wherein said coupling comprises a bore having a female spline and an outer surface having a male spline for respectively receiving said first shaft end and said second shaft end.

4. The article of manufacture recited in claim 1, wherein said dry lubricant is graphite.

5. The article of manufacture recited in claim 1, wherein said coupling is manufactured by a process employing near-net shape preforming of said coupling.

6. An oil-less shaft coupling joint comprising:
   a first shaft;
   a second shaft that is co-axial with the first shaft for imparting speed and torque to the second shaft;
   an oil-less shaft coupling having axial ends, such that one such end receives said first shaft and another such end receives said second shaft said coupling is formed of a self-lubricating, dry lubricant impregnated carbon-carbon composite, and not a polymer matrix composite, said carbon-carbon composite having a maximum usage temperature which exceeds 2500° F., wherein said coupling joint provides for oil-less power transmission between the coaxial shafts.

7. The coupling joint recited in claim 6, wherein said coupling joint comprises splines for engaging at least one of said shaft ends.

8. The coupling joint recited in claim 6, wherein said coupling joint comprises a bore having a female spline and an outer surface having a male spline for respectively receiving said shaft ends.

9. The coupling joint recited in claim 6, wherein said coupling joint is manufactured by a process employing near-net shape preforming of said coupling joint.

10. The coupling joint as recited in claim 6, wherein said carbon-carbon composite material is partially porous for receiving a dry lubricant.

11. The coupling joint as recited in claim 10, wherein said dry lubricant is graphite.

12. An oil-less shaft coupling device comprising:

a first shaft having a first axial end;

a second shaft having a second axial end;

an interior portion for receiving said first axial end;

an exterior portion for receiving said second axial end;

a coupling being made of a carbon-carbon composite, and not a polymer matrix composite, said carbon-carbon composite having a maximum usage temperature of over 2500° F.;

said carbon-carbon composite material comprising at least one of polyacrylonitride-based and pitch-based carbon fibers embedded in a carbonaceous matrix made by at least one of chemical vapor infiltration and impregnation of organic binders, followed by a graphitization/densification process;

said coupling comprising splines for engaging at least one of said first axial end and said second axial end; and said coupling being impregnated with a dry lubricant.

13. The oil-less shaft coupling device according to claim 12 wherein said dry lubricant is selected from the group consisting of graphite, molybdenum disulphide and combinations thereof.

* * * * *